United States Patent
Almog et al.

(10) Patent No.: US 9,265,004 B2
(45) Date of Patent: Feb. 16, 2016

(54) INTERMITTENT SHUTOFF OF RF CIRCUITRY IN WIRELESS COMMUNICATION TERMINALS

(75) Inventors: Edan Almog, Jerusalem (IL); Yigal Bitran, Ramat Hasharon (IL)

(73) Assignee: ALTAIR SEMICONDUCTOR LTD, Hod-Hasharon (IL)

( * ) Notice: Subject to any disclaimer, the term of this patent is extended or adjusted under 35 U.S.C. 154(b) by 174 days.

(21) Appl. No.: 13/978,147

(22) PCT Filed: Jan. 25, 2012

(86) PCT No.: PCT/IB2012/050337
§ 371 (c)(1),
(2), (4) Date: Jul. 3, 2013

(87) PCT Pub. No.: WO2012/104749
PCT Pub. Date: Aug. 9, 2012

(65) Prior Publication Data
US 2013/0301508 A1 Nov. 14, 2013

Related U.S. Application Data

(60) Provisional application No. 61/438,664, filed on Feb. 2, 2011.

(51) Int. Cl.
*H04W 52/02* (2009.01)
(52) U.S. Cl.
CPC ........ *H04W 52/028* (2013.01); *H04W 52/0229* (2013.01)
(58) Field of Classification Search
None
See application file for complete search history.

(56) References Cited

U.S. PATENT DOCUMENTS

| | | | |
|---|---|---|---|
| 5,241,542 A | 8/1993 | Natarajan et al. | |
| 5,376,929 A | 12/1994 | Rakolta et al. | |
| 5,956,656 A | 9/1999 | Yamazaki | |
| 6,985,432 B1 | 1/2006 | Hadad et al. | |

(Continued)

FOREIGN PATENT DOCUMENTS

| CN | 101097544 A | 1/2008 |
|---|---|---|
| WO | 2006134472 A2 | 12/2006 |

(Continued)

OTHER PUBLICATIONS

International Application PCT/IL2007/001600 Search Report dated Mar. 30, 2009.

(Continued)

*Primary Examiner* — Charles C Jiang
*Assistant Examiner* — George Atkins, Jr.
(74) *Attorney, Agent, or Firm* — D.Kligler IP Services Ltd.

(57) ABSTRACT

A method for communication in a receiver (20) includes receiving over a wireless communication channel a signal that carries at least a control channel. A first estimate of a response of the wireless communication channel is computed using a first estimation process having a first latency, and the control channel is decoded based on the first estimate. Upon identifying, based on the decoded control channel, a time period during which no data channel is to be addressed to the receiver, circuitry (24) of the receiver is shut down for at least part of the identified time period. A second estimate of the response is computed using a second estimation process having a second latency, higher than the first latency, and a data channel that is addressed to the receiver is decoded based on the second estimate.

14 Claims, 3 Drawing Sheets

(56) References Cited

U.S. PATENT DOCUMENTS

| | | | |
|---|---|---|---|
| 7,126,996 | B2 | 10/2006 | Classon et al. |
| 7,133,646 | B1 | 11/2006 | Miao |
| 7,133,669 | B2 | 11/2006 | Nair et al. |
| 7,181,190 | B2 | 2/2007 | Abhishek et al. |
| 7,363,051 | B2 | 4/2008 | Bridgelall |
| 7,406,296 | B2 | 7/2008 | Haartsen et al. |
| 7,542,728 | B2 | 6/2009 | Bitran et al. |
| 7,545,787 | B2 | 6/2009 | Bitran et al. |
| 7,567,820 | B2 | 7/2009 | Bitran |
| 7,881,252 | B2 | 2/2011 | Bitran |
| 8,462,746 | B2 * | 6/2013 | Bitran et al. ............ 370/338 |
| 2002/0136233 | A1 | 9/2002 | Chen et al. |
| 2002/0181509 | A1 | 12/2002 | Mody et al. |
| 2003/0054788 | A1 | 3/2003 | Sugar et al. |
| 2003/0086371 | A1 | 5/2003 | Walton et al. |
| 2003/0169824 | A1 | 9/2003 | Chayat |
| 2004/0014505 | A1 | 1/2004 | Rainish et al. |
| 2004/0029619 | A1 | 2/2004 | Liang et al. |
| 2004/0162106 | A1 | 8/2004 | Monroe et al. |
| 2005/0020299 | A1 | 1/2005 | Malone et al. |
| 2005/0025093 | A1 | 2/2005 | Yun et al. |
| 2005/0059347 | A1 | 3/2005 | Haartsen |
| 2005/0148306 | A1 | 7/2005 | Hiddink |
| 2005/0195786 | A1 | 9/2005 | Shpak |
| 2005/0266853 | A1 | 12/2005 | Gallagher et al. |
| 2006/0198476 | A1 | 9/2006 | Palaskas et al. |
| 2006/0221917 | A1 | 10/2006 | McRae |
| 2007/0066359 | A1 | 3/2007 | Zhuang |
| 2007/0076649 | A1 | 4/2007 | Lin et al. |
| 2007/0082716 | A1 | 4/2007 | Behzad et al. |
| 2007/0104145 | A1 | 5/2007 | Jan |
| 2007/0110003 | A1 | 5/2007 | Tujkovic et al. |
| 2007/0124478 | A1 | 5/2007 | Abdelhamid et al. |
| 2007/0140256 | A1 | 6/2007 | Yaqub |
| 2007/0153834 | A1 | 7/2007 | Qu et al. |
| 2007/0183383 | A1 | 8/2007 | Bitran et al. |
| 2007/0184798 | A1 | 8/2007 | Bitran et al. |
| 2007/0184835 | A1 | 8/2007 | Bitran et al. |
| 2007/0201369 | A1 | 8/2007 | Pedersen et al. |
| 2007/0275746 | A1 | 11/2007 | Bitran |
| 2008/0025422 | A1 | 1/2008 | Bitran et al. |
| 2008/0192720 | A1 * | 8/2008 | Frederiksen et al. ......... 370/344 |
| 2008/0240022 | A1 | 10/2008 | Yoon et al. |
| 2008/0298316 | A1 | 12/2008 | Bitran et al. |
| 2009/0088172 | A1 | 4/2009 | Lusky et al. |
| 2009/0129367 | A1 | 5/2009 | Bitran et al. |
| 2010/0097937 | A1 * | 4/2010 | Pietraski et al. ............ 370/241 |
| 2010/0131955 | A1 * | 5/2010 | Brent et al. ............ 718/103 |
| 2010/0202384 | A1 | 8/2010 | Baker et al. |
| 2010/0248750 | A1 * | 9/2010 | Muller et al. ............ 455/458 |
| 2010/0322158 | A1 * | 12/2010 | Lee et al. ............ 370/329 |
| 2010/0330992 | A1 * | 12/2010 | Bhattacharjee et al. ...... 455/436 |
| 2011/0044261 | A1 * | 2/2011 | Cai et al. ............ 370/329 |
| 2011/0199995 | A1 * | 8/2011 | Ito et al. ............ 370/329 |

FOREIGN PATENT DOCUMENTS

| | | | | |
|---|---|---|---|---|
| WO | 20071279472 | A2 | 11/2007 | |
| WO | 2008078311 | A2 | 7/2008 | |
| WO | WO2009081388 | * | 7/2009 | ............ H04W 88/06 |

OTHER PUBLICATIONS

Philips Semiconductors, "How 802.11b/g WLAN and Bluetooth Can Play", White Paper, Koninklijke Philips Electronics N.V., Netherlands, 2005.

Texas Instruments Incorporated, "Wireless Performance Optimization Solutions: Bluetooth and 802.11 coexistence", USA, 2003.

Bluetooth, "Specification of the Bluetooth System: Master Table of Contents & Compliance Requirements: Core Package Version 2.0 + EDR", Nov. 4, 2004.

Gesbert et al., "From Theory to Practice: An Overview of MIMO Space-Time Coded Wireless Systems", IEEE Journal on Selected Areas in Communications, vol. 21, No. 3, pp. 281-302, Apr. 2003.

IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.

IEEE Standard 802.16e-2005 for Local and metropolitan area networks, "Part 16: Air Interface for Fixed Broadband Wireless Access Systems; Amendment 2 and Corrigendum 1", Physical and Medium Access Control Layers for Combined Fixed and Mobile Operation in Licensed Bands, Amendment and Corrigendum to IEEE Standard 802.16-2004, IEEE Computer Society and IEE Microwave Theory and Techniques Society, USA, Feb. 28, 2006.

IEEE Inc., "A compilation based on IEEE Standard 802.11-1999 (revision 2003) and its amendments", IEEE Wireless LAN Edition, IEEE Press, USA, 2003.

Tomchik J., "QFDD and QTDD: Proposed Draft Air Interface Specification", IEEE 802.20 Working Group on Mobile Broadband Wireless Access, Qualcomm, Inc., USA, Oct. 28, 2005.

Altair Semiconductor, "TRIMAX: Coexistence of WiMAX, Bluetooth and WLAN in converged handsets (Non NDS version)", White paper 0012, Revision 1.00, Jul. 2006.

Bachu et al., "Linear Interference Cancellation for Downlink Map Reception in IEEE 802.16E", The 17th Annual IEEE International Symposium on Personal, Indoor and Mobile Radio Communications (PIMRC06), Helsinki, Finland, Sep. 11-14, 2006.

Klang et al., "Identification of Radio-Link Technologies", Deliverable D2.1 of the Wireless World Initiative—New Radio (Winner), ISR-2003-507581, version 1.0, Jul. 1, 2004.

Laine, Jeremy, "Interference Estimation in a Multicellular OFDMA Environment", Master Thesis, Department of Signals, Sensors and Systems, Royal Institute of Technology, Stockholm, Sweden, Jul. 2004.

Tang et al., "Space-Time Interference Cancellation in MIMO-OFDM Systems", IEEE Transactions on Vehicular Technology, vol. 54, No. 5, pp. 1802-1816, Sep. 2005.

U.S. Appl. No. 11/647,123 Official Action dated Aug. 28, 2009.

U.S. Appl. No. 11/647,123 Official Action dated Feb. 16, 2010.

International Application PCT/IB2012/050337 Search Report dated Jun. 1, 2012.

Edfors et al., "Analysis of DFT-based Channel Estimators for OFDM", Division of Signal Processing Research Report, Lulea University of Technology, 25 pages, year 1996.

Hoeher et al., "Two-dimensional Pilot-Symbol-Aided Channel Estimation by Wiener Filtering", Proceedings of the IEEE International Conference on Acoustics, Speech, and Signal Processing (ICASSP), pp. 1845-1848, Munich, Germany, Apr. 1997.

CN Patent Application No. 200780051518.6 Office Action dated Jan. 30, 2013.

U.S. Appl. No. 12/518,426 Official Action dated Dec. 21, 2012.

U.S. Appl. No. 12/518,426 Official Action dated Aug. 30, 2012.

U.S. Appl. No. 12/518,426 Official Action dated Jun. 12, 2012.

U.S. Appl. No. 12/518,426 Official Action dated Nov. 25, 2011.

China Patent Office, Chinese Office Action mailed Feb. 4, 2015, in Chinese Patent Application No. 201180046867.5.

* cited by examiner

INTERMITTENT SHUTOFF OF RF CIRCUITRY IN WIRELESS COMMUNICATION TERMINALS

CROSS-REFERENCE TO RELATED APPLICATIONS

This application claims the benefit of U.S. Provisional Patent Application 61/438,664, filed Feb. 2, 2011, whose disclosure is incorporated herein by reference.

FIELD OF THE INVENTION

The present invention relates generally to wireless communication, and particularly to methods and devices for intermittent shut-down of Radio Frequency (RF) circuitry in wireless communication equipment.

BACKGROUND OF THE INVENTION

Reduction of power consumption is a prime consideration in the design of communication equipment, and particularly in battery-operated wireless communication terminals. Some wireless terminals reduce power consumption by intermittently shutting down Radio Frequency (RF) circuitry. For example, U.S. Pat. No. 7,881,252 and U.S. Patent Application Publication 2010/0284379, whose disclosures are incorporated herein by reference, describe a wireless receiver with intermittent shut-off of RF circuits. The terminal includes an RF receiver, which is configured to receive and down-convert an RF signal. The RF signal includes a sequence of downlink frames, each downlink frame including at least a map zone followed by a data zone.

The map zone contains an indication of a time allocation in the data zone during which downlink data will be transmitted to the terminal. An analog/digital (A/D) converter converts the output signal from the RF receiver into a stream of digital samples. A digital processing circuit processes the digital samples so as to identify the time allocation and to recover the downlink data transmitted during the identified time allocation, while shutting down the RF receiver during at least one interval during the downlink frame that is outside the identified time allocation.

SUMMARY OF THE INVENTION

An embodiment of the present invention that is described herein provides a method for communication in a receiver. The method includes receiving over a wireless communication channel a signal that carries at least a control channel. A first estimate of a response of the wireless communication channel is computed using a first estimation process having a first latency, and the control channel is decoded based on the first estimate. Upon identifying, based on the decoded control channel, a time period during which no data channel is to be addressed to the receiver, circuitry of the receiver is shut down for at least part of the identified time period. A second estimate of the response is computed using a second estimation process having a second latency, higher than the first latency, and a data channel that is addressed to the receiver is decoded based on the second estimate.

In some embodiments, the first estimation process includes a causal estimation process that estimates the response for a given time using only one or more reference signals that are no later than the given time, and the second estimation process includes a non-causal estimation process that estimates the response using at least one reference signal that is subsequent to the given time.

In alternative embodiments, the first estimation process estimates the response for a given time using one or more reference signals in a first time interval following the given time, and the second estimation process estimates the response for the given time using at least one reference signal in a second time interval following the given time, longer than the first time interval. In a disclosed embodiment, the first estimation process has a first processing delay, and the second estimation process a second processing delay, larger than the first processing delay.

In an embodiment, identifying the time period includes detecting that the control channel conveys an allocation for the data channel addressed to the receiver, and selecting the time period so as to fall outside the allocation. In another embodiment, the received signal conforms to a Long Term Evolution (LTE) specification, the control channel includes a Physical Downlink Control Channel (PDCCH), and the data channel includes a Physical Downlink Shared Channels (PDSCH).

There is additionally provided, in accordance with an embodiment of the present invention, a communication apparatus including a receiver and processing circuitry. The receiver is configured to receive over a wireless communication channel a signal that carries at least a control channel. The processing circuitry is configured to compute a first estimate of a response of the wireless communication channel using a first estimation process having a first latency, to decode the control channel based on the first estimate, to shut-down, upon identifying based on the decoded control channel a time period during which no data channel is to be addressed to the receiver, circuitry of the receiver for at least part of the identified time period, to compute a second estimate of the response using a second estimation process having a second latency, higher than the first latency and to decode a data channel that is addressed to the receiver based on the second estimate.

There is also provided, in accordance with an embodiment of the present invention, a method for communication in a receiver. The method includes receiving a signal that carries a sequence of frames, each frame including at least a control channel and a data zone. The received signal is decoded such that decoding of the control channel of a second frame begins before a data channel in the data zone of a first frame, which precedes the second frame in the sequence, is fully decoded. Based on the decoded control channel of the second frame, a time period is identified during which no data is to be addressed to the receiver in the data zone of the second frame. Circuitry of the receiver is shut down for at least part of the identified time period.

In some embodiments, decoding the received signal includes decoding the control channel and the data channel using respective, independent first and second decoders. In another embodiment, decoding the received signal includes sharing a processing resource between decoding of the control channel and decoding of the data channel, and prioritizing assignment of the shared processing resource such that decoding of the control channel of the second frame begins before the data channel of the first frame is fully decoded.

In yet another embodiment, identifying the time period includes detecting that the control channel of the second frame does not contain a data channel allocation addressed to the receiver. In still another embodiment, identifying the time period includes detecting that the control channel of the second frame conveys a data channel allocation addressed to the receiver, and selecting the time period so as to fall outside the data channel allocation. In an embodiment, the received signal conforms to a Long Term Evolution (LTE) specification, the control channel includes a Physical Downlink Control Channel (PDCCH), and the data channel includes a Physical Downlink Shared Channel (PDSCH).

There is also provided, in accordance with an embodiment of the present invention, a communication apparatus including a receiver and processing circuitry. The receiver is configured to receive a signal that carries a sequence of frames, each frame including at least a control channel and a data zone. The processing circuitry is configured to decode the received signal such that decoding of the control channel of a second frame begins before a data channel in the data zone of a first frame, which precedes the second frame in the sequence, is fully decoded, to identify, based on the decoded control channel of the second frame, a time period during which no data is to be addressed to the apparatus in the data zone of the second frame, and to shut down circuitry of the receiver for at least part of the identified time period.

There is further provided, in accordance with an embodiment of the present invention, a method for communication in a receiver. The method includes receiving a signal conveying a control message, which is formatted in accordance with a respective message configuration selected from a predefined set of possible message configurations, and a data zone. A definition of multiple decoding hypotheses corresponding respectively to the possible message configurations is provided, each hypothesis divided into respective first and second decoding stages that are executed in sequence. The control message is decoded multiple times concurrently, in accordance with the respective hypotheses, while prioritizing execution of the first decoding stages of the hypotheses over the execution of the second decoding stages of the hypotheses. Upon verifying, based only upon the first decoding stages, that no data is to be addressed to the receiver in the data zone, circuitry of the receiver is shut down during at least part of the data zone.

In some embodiments, verifying that no data is addressed to the receiver includes identifying that the first decoding stages have failed for all the hypotheses. In an embodiment, each of the first decoding stages ends with a Cyclic Redundancy Check (CRC) verification. In a disclosed embodiment, each of the first decoding stages ends with a verification whether a format of the control message is indicative of a data channel allocation. In another embodiment, prioritizing the execution includes preventing execution of any of the second decoding stages until completion of all the first decoding stages.

In yet another embodiment, prioritizing the execution includes sharing a processing resource between the first and second decoding stages, and prioritizing assignment of the shared processing resource such that the first decoding stages have priority over the second decoding stages. In still another embodiment, decoding the control message includes executing the first and second decoding stages of the multiple hypotheses using a processing pipeline, and prioritizing the execution includes preventing a second decoding stage that is present in the pipeline from delaying execution of a second decoding stage that is subsequent to the first decoding stage in the pipeline.

In some embodiments, identifying the time period includes detecting that the control message is not addressed to the receiver. In an embodiment, identifying the time period includes detecting that the control message does not indicate a data channel allocation addressed to the receiver. In a disclosed embodiment, the received signal conforms to a Long Term Evolution (LTE) specification, and the control message is received on a Physical Downlink Control Channel (PDCCH).

There is further provided, in accordance with an embodiment of the present invention, a communication apparatus including a receiver and processing circuitry. The receiver is configured to receive a signal conveying control message, which is formatted in accordance with a respective message configuration selected from a predefined set of possible message configurations, and a data zone. The processing circuitry is configured to provide a definition of multiple decoding hypotheses corresponding respectively to the possible message configurations, each hypothesis divided into respective first and second decoding stages that are executed in sequence, to decode the control message multiple times concurrently, in accordance with the respective hypotheses, while prioritizing execution of the first decoding stages of the hypotheses over the execution of the second decoding stages of the hypotheses, and, upon verifying, based only upon the first decoding stages, that no data is to be addressed to the apparatus in the data zone, to shut down circuitry of the receiver during at least part of the data zone.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for performing intermittent shutdown of receiver circuitry in order to reduce power consumption. In the disclosed embodiments, a transmitter transmits a signal carrying a sequence of communication frames. Each frame comprises a control channel followed by a data zone. A receiver decodes the control channel, so as to determine whether the data zone contains data addressed to the receiver, and the location of the data within the data zone. Using this information, the receiver identifies at least one time period that does not contain data addressed to the terminal, and shuts down at least some of the receiver circuitry during at least part of the identified time period.

The techniques described herein enable the receiver to decode the control channel with small latency, and thus advance the point in time at which it is possible to start shutting down the receiver circuitry. The embodiments described herein refer mainly to downlink transmission in Long Term Evolution (LTE) systems, in which the frames comprise LTE downlink sub-frames, the control channel comprises a Physical Downlink Control Channel (PDCCH) and the data in the data zone is transmitted on Physical Downlink Shared Channels (PDSCH). The disclosed techniques, however, are not limited to LTE systems and can be used in various other types of communication systems.

In a typical implementation, the receiver first estimates the response of the wireless communication channel between the transmitter and the receiver, and then decodes the control and data channels based on the estimated channel response. The receiver typically estimates the response of the communication channel by processing reference signals (sometimes referred to as pilot signals) that are transmitted as part of the signal.

In some embodiments, the receiver computes two estimates of the channel response—One estimate for the control channel using an estimation process having a certain latency, and another estimate for the data channel using a different estimation process having a longer latency but better accuracy. In an example embodiment, the estimation process for the control channel is causal, i.e., estimates the channel response for a given point in time using only one or more reference signals that are no later than the given point in time. The estimation process for the data channel is non-causal, i.e., estimates the channel response using at least one reference signal that is subsequent to the given point in time. The causal estimation process typically incurs smaller latency than the non-causal estimation process, at the expense of lower accuracy.

In this example embodiment, the receiver decodes the control channel using the channel estimate produced by the causal estimation process, and decodes the data channel using the channel estimate produced by the non-causal estimation process. Using this technique, the control channel is decoded with small latency, and the receiver is therefore able to advance shutting-down of the receiver circuitry. The data channel, on the other hand, is decoded with high accuracy. Other examples of differing estimation processes for the control channel and for the data channel are described herein.

In other disclosed embodiments, the receiver decodes the control and data channels of the different frames out of order, such that control channel decoding of the $N^{th}$ frame begins before data channel decoding of the $N-1^{th}$ frame is completed. The receiver may carry out this sort of out-of-order decoding, for example, by decoding the control and data channels using separate decoding circuitry, or using a suitable prioritization scheme. Using this technique, control channel decoding is not delayed by data channel decoding from the previous frame. The latency of control channel decoding is therefore reduced, and the receiver is able to shut down the receiver circuitry sooner and conserve power.

In other disclosed embodiments, the control channel carries control messages to various receivers. Each control message is formatted in accordance with a respective message configuration that is selected from a predefined set of possible message configurations. In LTE downlink, for example, the PDCCH is transmitted using Downlink Control Information (DCI) messages, each formatted in accordance with one of forty-four possible message configurations. A given receiver is expected to test multiple decoding hypotheses, i.e., perform multiple attempts to decode the control channel in accordance with the multiple possible message configurations in the set.

Each decoding hypothesis can be partitioned into two stages that are executed in sequence. The partitioning into stages is defined such that failure of the first stages of all decoding hypotheses indicates that no data has been addressed to the receiver in the current sub-frame. (Successful decoding of the first decoding stage for one or more hypotheses, however, does not necessarily guarantee that data has been addressed to the receiver.)

In these embodiments, the receiver tests the multiple hypotheses concurrently, while assigning high priority to execution of the first stages of the various hypotheses. Using this technique, the receiver advances the point in time at which it is able to decide that no data is to be addressed to the receiver in the data zone of the current sub-frame. If no data is expected, the receiver may shut down the receiver circuitry for at least part of the data zone.

System Description

Figure 1:
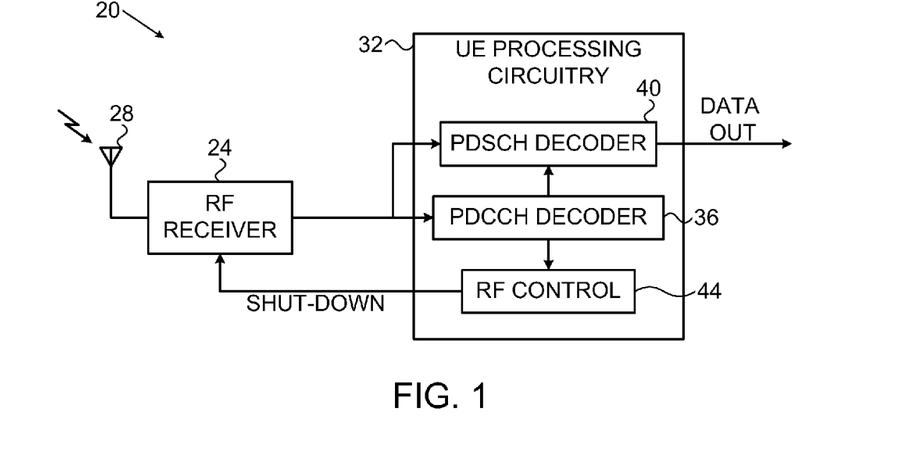
FIG. 1 is a block diagram that schematically illustrates a wireless communication terminal, in accordance with an embodiment of the present invention.

FIG. 1 is a block diagram that schematically illustrates a wireless communication terminal 20, in accordance with an embodiment of the present invention. Terminal 20 may comprise, for example, a mobile phone, a wireless-enabled mobile computing device, or any other suitable type of communication terminal. In the present example, terminal 20 operates in accordance with the Third Generation Partnership Project (3GPP) Long Term Evolution (LTE) specifications, defined in the 3GPP series 36 Technical Specifications (TS). In alternative embodiments, however, terminal 20 may operate in accordance with other communication protocols such as, for example, WiMAX (e.g., IEEE 802.16e or 802.16m), XG-PHS, AXGP, or any other suitable communication standard or protocol. Terminal 20 is also referred to herein as User Equipment (UE). FIG. 1 focuses on the reception functions of the terminal, for the sake of clarity, although the terminal typically carries out both transmission and reception.

In the embodiment of FIG. 1, terminal 20 comprises at least one antenna 28 for receiving signals from a transmitter, in the present example from a base station. Terminal 20 comprises a Radio Frequency (RF) receiver 24 and processing circuitry 32. Receiver 24 receives an RF signal from antenna 28, down-converts the RF signal to baseband, digitizes the signal and provides it to processing circuitry 32. The receiver may also perform functions such as filtering, amplification and gain control.

The received signal carries a sequence of LTE downlink sub-frames that are transmitted by the base station. In accordance with the LTE specifications, each sub-frame comprises multiple Orthogonal Frequency Division Multiplexing (OFDM) symbols. The first one to four OFDM symbols in each sub-frame are used for transmitting a Physical Downlink Control Channel (PDCCH). The remaining OFDM symbols form a data zone for transmitting data to various terminals 20 on respective Physical Downlink Shared Channels (PDSCH).

Processing circuitry 32 comprises a PDCCH decoder 36 for decoding the PDCCH, and a PDSCH decoder 40 for decoding the PDSCH. The PDCCH of a given sub-frame indicates the PDSCH allocations that are allocated in the data zone of this sub-frame. For each allocated PDSCH, the PDCCH indicates the location of the PDSCH in the data zone of the sub-frame. By decoding the PDCCH using decoder 36, terminal 20 is able to determine whether or not a PDSCH is addressed to the terminal in the data zone of the current sub-frame, and the location of the PDSCH if allocated. If the decoded PDCCH indicates a PDSCH allocation in the current sub-frame, decoder 40 accesses the appropriate location in the data zone and decodes the PDSCH. The decoded data is provided as output.

In some embodiments, processing circuitry 32 comprises an RF control unit 44 that performs intermittent shut-down of at least some of the circuitry of RF receiver 24, in order to reduce the power consumption of terminal 20. Unit 44 may shut-down any suitable circuitry in receiver 24, for example RF circuitry, Intermediate Frequency (IF) circuitry, baseband circuitry, ancillary or control circuitry, or any other suitable type of circuit. The term "shut-down" refers to any form of deactivation that limits the functionality of receiver 24 in order to reduce its power consumption. Shut-down may be performed, for example, by reducing or switching off the supply voltage of selected circuitry, by modifying the biasing of selected circuitry, by attenuating or switching off RF signals provided to selected circuitry, or using any other suitable mechanism.

Typically, PDCCH decoder 36 notifies RF control unit 44 whether a PDSCH is allocated to terminal 20 in the current sub-frame. If a PDSCH is allocated, decoder 36 indicates the location, e.g., Resource Block (RB) indices, of the allocation in the data zone.

Based on the notification from PDCCH decoder 36, RF control unit 44 identifies at least one time period in the current sub-frame in which no data is addressed to terminal 20. Unit 44 then shuts-down at least some of the circuitry of receiver 24 during at least part of the identified time period, and thus reduces the terminal's power consumption. Typically, when no PDSCH is allocated for terminal 20 in the current sub-frame, unit 44 may shut-down the receiver circuitry for the remainder of the sub-frame.

As can be appreciated from the description above, any latency in the decoding of the PDCCH by decoder 36 will delay the point in time at which unit 44 may begin shutting down the receiver circuitry. In other words, any reduction in PDCCH decoding latency will enable unit 44 to shut-down the receiver circuitry earlier, and thus for a longer period of time. Reducing the PDCCH decoding latency therefore helps to reduce the terminal's power consumption. Several examples of decoding schemes that decode the PDCCH with small latency, and therefore enable early shut-down and reduced power consumption, are described below.

The configuration of terminal 20 shown in FIG. 1 is an example configuration, which is chosen purely for the sake of conceptual clarity. In alternative embodiments, any other suitable terminal configuration can be used. For example, although FIG. 1 shows separate decoders for decoding the PDCCH and PDSCH, circuitry 32 may alternatively comprise certain shared hardware that is used for both PDCCH and PDSCH decoding. Certain elements of terminal 20 may be implemented using hardware, such as using one or more Application-Specific Integrated Circuits (ASICs) or Field-Programmable Gate Arrays (FPGAs). Alternatively, some elements of terminal 20 may be implemented in software or using a combination of hardware and software elements.

In some embodiments, certain functions of terminal 20 may be implemented using a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Decoding Control Channel and Data Channel Using Channel Estimation Processes Having Different Latencies Typically, processing circuitry 32 of terminal 20 first estimates the response of the communication channel from the base station to terminal 20, and then decodes the control and data channels based on the channel estimate. The channel estimation process typically operates on reference signals (sometimes referred to as pilot signals) whose waveforms are known a-priori to the receiver.

Various channel estimation processes can be used for this purpose. Some channel estimation processes filter the received reference signals over time and/or frequency (e.g., using Finite Impulse Response—FIR filtering), and possibly apply interpolation and/or extrapolation, in order to estimate the channel response for a given time-frequency bin.

In some embodiments, processing circuitry 32 uses different channel estimation processes for the PDCCH and for the PDSCH. The channel estimation process for the PDCCH is typically optimized for small latency at the possible expense of slightly degraded accuracy. The small PDCCH latency enables terminal 20 to shut down the receiver circuitry early. The channel estimation process for the PDSCH is typically optimized accuracy, and is less sensitive to latency.

In an example embodiment, the channel estimation process for the PDCCH is causal, while the channel estimation process for the PDSCH is non-causal. A causal channel estimation process estimates the channel response for a given point in time by processing only (one or more) reference signals that are no later than the given point in time. In LTE, a causal estimation process estimates the channel response for decoding a given OFDM symbol using only one or more reference signals that precede or are concurrent with this OFDM symbol.

A non-causal channel estimation process, on the other hand, estimates the channel response for a given point in time by processing at least one reference signal that is subsequent to the given point in time. (A non-causal process typically uses both reference signals that are earlier than the given point in time and reference signals that are later than the given point in time.) In the LTE example, a non-causal estimation process estimates the channel response for decoding a given OFDM symbol using at least one reference signal that is subsequent to this OFDM symbol.

Possible channel estimation processes that can be used by processing circuitry 32 in a causal or non-causal manner are described, for example, by Edfors et al., in "Analysis of DFT-based Channel Estimators for OFDM" Division of Signal Processing Research Report, Luleå University of Technology, 1996, and by Hoeher et al., in "Two-Dimensional Pilot-Symbol-Aided Channel Estimation by Wiener Filtering," Proceedings of the IEEE International Conference on Acoustics, Speech, and Signal Processing (ICASSP), Munich, Germany, April, 1997, pages 1845-1848, which are incorporated herein by reference.

For a comparable computational complexity, non-causal channel estimation processes typically achieve higher estimation accuracy than causal channel estimation processes. On the other hand, non-causal channel estimation processes typically require more buffering and incur higher latency than causal processes, because of the need to wait for reception of later reference signals.

In some embodiments of the present invention, PDCCH decoder 36 decodes the PDCCH using causal channel estimation, and PDSCH decoder 40 decodes the PDSCH using non-causal channel estimation. This trade-off matches the channel estimation process to the unique requirements of each channel type: The PDCCH is decoded with small latency, which enables terminal 20 to shut down the receiver circuitry early. The PDSCH, on the other hand, is decoded based on the higher-accuracy channel estimation of the non-causal process.

The PDCCH is typically transmitted with a robust transmission scheme (e.g., modulation or constellation mapping, coding rate and/or transmit power) that is more tolerable to the accuracy of the causal channel estimation. The PDSCH, on the other hand, may require higher channel estimation accuracy for successful decoding, especially in poor Signal to Noise Ratio (SNR) high mobility or other difficult channel conditions.

Figure 2:
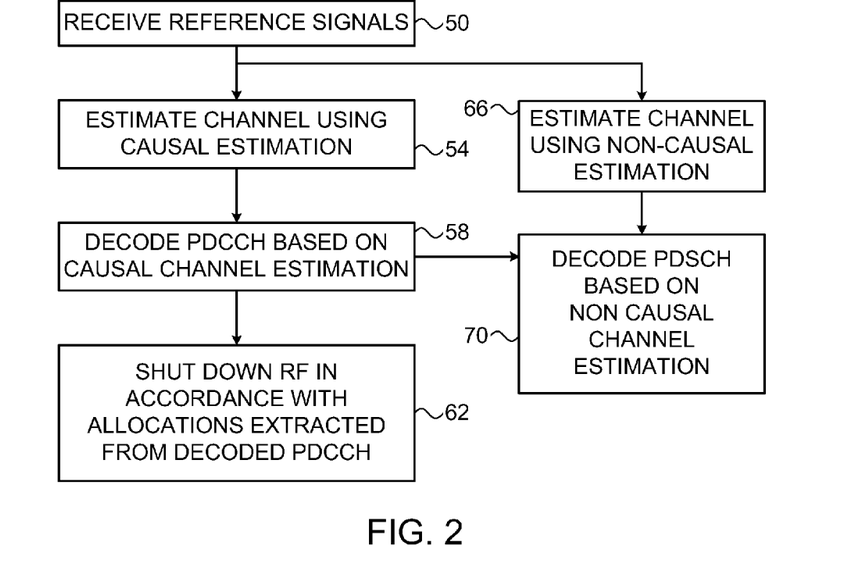
FIG. 2 is a flow chart that schematically illustrates a method for intermittent RF shut-down in a wireless communication terminal, in accordance with an embodiment of the present invention.

FIG. 2 is a flow chart that schematically illustrates a method for intermittent RF shut-down in a wireless communication terminal 20, in accordance with an embodiment of the present invention. The method begins with receiver 24 receiving a downlink signal transmitted from the base station. The downlink signal comprises a sequence of sub-frames, each comprising a PDCCH followed by a data zone. In particular, receiver 24 receives reference signals that are transmitted by the base station as part of the downlink signal, at a reference signal reception step 50.

PDCCH decoder 36 estimates the channel response between the base station and the terminal using a causal estimation process, at a causal estimation step 54. The PDCCH decoder decodes the PDCCH of a given sub-frame based on the causal channel estimate, at a PDCCH decoding step 58. In particular, PDCCH decoder identifies any PDSCH allocation that is allocated to terminal 20 in the data zone of the sub-frame.

Depending on the identified allocation (or lack of allocation), decoder 36 identifies a time period in which no data is to be transmitted to terminal 20. For example, if no PDSCH allocation to terminal 20 is identified, the time period spans the remainder of the current sub-frame. If decoder 36 identifies a PDSCH allocation to terminal 20, the time period may comprise any time interval that precedes and/or follows this allocation. RF control unit 44 shuts down circuitry of receiver 24 for the identified time period, at an RF shut-down step 62.

Typically, PDSCH decoder 40 estimates the communication channel response using non-causal channel estimation, at a non-causal estimation step 66. The PDSCH decoder decodes the PDSCH based on the non-causal channel estimation, at a PDSCH decoding step 70.

In various embodiments, any suitable causal and non-causal channel estimation processes can be used for estimating the channel response by decoders 36 and 40 at steps 54 and 66, respectively.

Since PDCCH decoder 36 decodes the PDCCH using causal channel estimation, the PDCCH decoder is able to identify the PDSCH allocation (or lack thereof) with small latency, and therefore advance the point in time at which the receiver circuitry is shut-down. Consequently, the power consumption of terminal is reduced.

In alternative embodiments, processing circuitry 32 may use any other suitable channel estimation processes, which estimate the channel for PDCCH decoding with smaller latency relative to the channel estimation for PDSCH decoding.

In another example embodiment, PDCCH decoder 36 and PDSCH decoder 40 both use non-causal channel estimation processes, but with different look-ahead intervals. PDCCH decoder 36 uses a non-causal process that estimates the channel for a given time using one or more reference signals in a certain time interval following the given time. PDSCH decoder 40, on the other hand, uses a non-causal process that estimates the channel for the given time using one or more reference signals in a longer time interval following the given time.

For example, the PDCCH decoder may estimate the channel using a 3-tap FIR time-domain filter that filters two causal reference signals and one non-causal reference signal. The PDSCH decoder in this example may estimate the channel using a 4-tap FIR time-domain filter that filters two causal reference signals and two non-causal reference signals. In this example too, the shorter look-ahead interval enables smaller latency at the possible expense of degraded accuracy.

In yet another example embodiment, the PDCCH decoder uses a channel estimation process having a certain processing delay (from the time the reference signals are available for processing until the channel estimate is available), and the PDSCH decoder uses a more complex (and thus higher accuracy) channel estimation process having a larger processing delay.

In some embodiments, PDSCH decoder 40 initiates estimation of the channel response using the second (higher-accuracy and high-latency) estimation process prior to identifying whether or not a data channel is addressed to terminal 20. When the control channel is decoded by PDCCH decoder 36, if a data channel addressed to terminal 20 is found, the PDSCH decoder may proceed with the second estimation process until completion and decode the data channel using the resulting channel estimate.

If a data channel is not addressed to the receiver, several possible actions can be taken: In one embodiment, RF control unit 44 shuts-down the receiver circuitry and the second estimation process is preempted. In another embodiment, unit 44 shuts-down the receiver circuitry and the second estimation process is continued based on an invalid signal. The resulting channel estimate is typically invalid, but this invalid estimate has no affect because it is not used for decoding in any way. In yet another embodiment, unit 44 shuts-down the receiver circuitry only for data symbols that contain neither data addressed to the receiver nor reference signals. The second channel estimation process proceeds, at least partially. This implementation is useful, for example, in cases where the channel estimation scheme continuity is leveraged to improve performance, e.g., in time-domain Infinite Impulse Response (IIR) or sliding window FIR schemes.

Out-Of-Order Processing of Control Channel and Data Channel

In some embodiments, processing circuitry 32 of terminal 20 advances the point in time at which receiver shut-down is possible, by decoding the PDCCH and PDSCH of the various sub-frames in an order that differs from the order of reception. In particular, the order of decoding is set such that PDCCH decoding of the $N^{th}$ sub-frame begins before PDSCH decoding of the $N-1^{th}$ sub-frame is completed.

Figure 3:
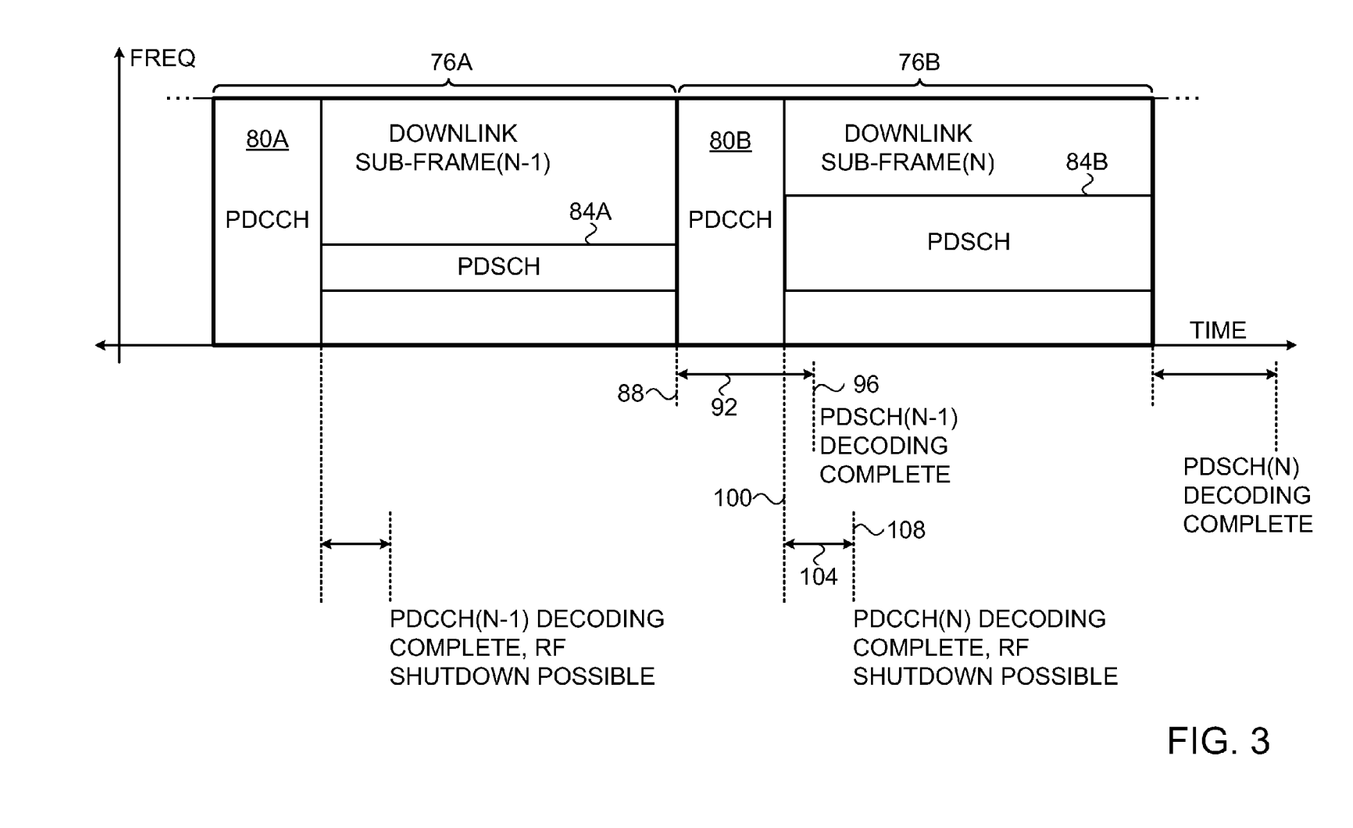
FIG. 3 is a diagram that schematically illustrates a process of out-of-order decoding and intermittent RF shut-down, in accordance with an embodiment of the present invention.

FIG. 3 is a diagram that schematically illustrates a process of out-of-order decoding and intermittent RF shut-down in terminal 20, in accordance with an embodiment of the present invention.

The figure shows two successive downlink sub-frames 76A and 76B, also referred to as the $N^{th}$ and $N-1^{th}$ sub-frames, respectively. The first OFDM symbols in each sub-frame carry a respective PDCCH - PDCCH 80A in sub-frame 76A, and PDCCH 80B in sub-frame 76B. The data zone that follows the PDCCH in each sub-frame may contain a data allocation for a PDSCH addressed to terminal 20. In the present example, A PDSCH 84A and a PDSCH 84B are addressed to terminal 20 in sub-frames 76A and 76B, respectively. In the present example, each downlink sub-frame comprises fourteen OFDM symbols numbered 0-13, the PDCCH spans symbols 0 and 1 in the sub-frame, and the PDSCH spans symbol 2-13. In this embodiment, symbols 0, 4, 7 and 11 carry Reference Signals (RS) used for channel estimation.

In many practical cases, the PDSCH decoding process of decoder 40 is long. In an example process, the PDSCH involves steps such as PDCCH processing in order to configure decoder 40 for proper PDSCH decoding, channel estimation, de-permutation, and constellation de-mapping (especially for Multiple-Input Multiple-Output—MIMO transmission modes). The PDSCH decoding latency may be, for example, on the order of 0.5-1.5 mS. Unlike the example shown in the figure, the PDSCH decoding latency may be on the order of the sub-frame length.

As such, decoding of the PDSCH of the $N-1^{th}$ sub-frame may well continue beyond the $N-1^{th}$ sub-frame and, unless accounted for, delay the decoding of the PDCCH of the $N^{th}$ sub-frame. In the example of FIG. 3, reception of PDSCH 84A (the PDSCH of the $N-1^{th}$ sub-frame) ends at a time 88. Decoder 40 decodes this PDSCH during an interval 92 that ends at a time 96, well within the $N^{th}$ sub-frame.

In some embodiments, PDCCH decoder 36 begins decoding PDCCH 80B (the PDCCH of the $N^{th}$ sub-frame) before decoder 40 completes decoding PDSCH 84A (the PDSCH of the $N-1^{th}$ sub-frame). As can be seen in the figure, reception of PDCCH 80B ends at a time 100.

Decoder 36 starts to decode PDCCH 80B at time 100, which occurs before PDSCH 84A is fully decoded (time 96). In other words, PDCCH decoding of the $N^{th}$ sub-frame is not delayed by the latency of the PDSCH decoding of the $N-1^{th}$ sub-frame. Decoder 36 decodes this PDCCH during an interval 104, which ends at a time 108.

At time 108 it is possible for circuitry 32 to identify (based on the decoded PDCCH) a time period during which no data is addressed to terminal 20, and shut down the receiver circuitry during such a period. This sort of out-of-order decoding enables circuitry 32 to identify whether receiver shutdown is possible as early as time 108, and thus advance the point in time at which the receiver circuitry can be shut down.

By contrast, without the out-of-order decoding mechanism it would only be possible to start decoding PDCCH 80B at time 96 rather than at time 100. This delay would in turn delay the point in time at which receiver shutdown is possible, and thus increase the receiver power consumption.

Processing circuitry 32 may perform the out-of-order decoding process described above in various ways. In some embodiments, as in the example of FIG. 1 above, PDCCH decoding and PDSCH decoding are performed by separate and independent decoders that do not share hardware or other resources between them. In alternative embodiments, the PDCCH and PDSCH decoders may share certain processing resources, e.g., processing hardware, for both PDCCH and PDSCH decoding. The assignment of the shared processing resources in these embodiments is prioritized in a manner that enables PDCCH decoding of the $N^{th}$ sub-frame to begin before completing PDSCH decoding of the $N-1^{th}$ sub-frame.

Multi-Stage Control Channel Decoding

In accordance with the LTE specifications, the PDCCH (control channel) is transmitted in the first one to four OFDM symbols of the downlink sub-frame. The first OFDM symbol carries a Control Format Indicator (CFI) that indicates the actual number of OFDM symbols that are used for the PDCCH in the current sub-frame.

The PDCCH comprises a logical sequence of Control Channel Elements (CCEs). In a given sub-frame, the PDCCH may or may not carry a Downlink Control Information (DCI) message to a given terminal 20. Each DCI message is transmitted in a successive series of CCEs. The CCEs are mapped to smaller physical resource elements denoted Resource Element Groups (REGs) that are permuted over time and frequency.

Each DCI message is formatted in accordance with one of forty-four possible message configurations, which are referred to as hypotheses. A given receiver is expected to check for DCI messages addressed thereto by testing the multiple decoding hypotheses, i.e., performing multiple attempts to decode the PDCCH in accordance with the multiple possible message configurations.

For a given CFI value, each hypothesis is defined by three parameters: The index of the first CCE starting the DCI message, the number of CCEs in the DCI message (referred to as message length), and an un-coded DCI message length.

The process of testing a given hypothesis by decoder 36 of FIG. 1, i.e., attempting to decode a DCI message according to one of the possible message formats, is typically a multi-phase process having the following phases:

Phase I: Physical channel decoding. This phase typically comprises channel estimation, equalization, de-permutation, constellation de-mapping (and MIMO decoding where applicable), de-scrambling, rate matching and channel decoding.

Phase II: Cyclic Redundancy Check (CRC) verification. This phase typically comprises CRC calculation, CRC Radio Network Temporary Identifier (RNTI) multiplication and CRC verification.

Phase III: Format parsing. This phase typically comprises inspecting a small number of bits in the decoded DCI message in order to identify the DCI format.

Phase IV: Message parsing and modem configuration. This phase typically comprises parsing the entire DCI message according to the identified DCI format, and configuring the modem of decoder 36 to decode the message accordingly.

In some cases, PDCCH decoder 36 may be able to conclude that no data is to be addressed to the terminal in the data zone of the current sub-frame, even without executing all the phases of all forty-four hypotheses. The PDCCH decoder may reach this conclusion, for example, if the CRC verification fails (end of phase II) for all hypotheses, or if the identified DCI format for all hypotheses is not PDSCH-related (end of phase III).

Upon concluding that no data is to be addressed to the terminal in the data zone of the current sub-frame, decoder 36 may instruct RF control unit 44 to shut down circuitry of receiver 24 for at least part of the data zone. It is advantageous to reach this conclusion as early as possible, and thus advance the point in time at which it is possible to shut down the receiver circuitry.

Thus, in some embodiments, PDCCH decoder 36 tests the multiple hypotheses concurrently, while assigning high priority to the initial phases of the various hypotheses over the final phases of the various hypotheses. This sort of prioritization enables decoder 36 to complete the initial phases of all hypotheses (e.g., phases I and II, or phases I-III) early, and invoke receiver shut down when appropriate.

In other words, the process of testing a hypothesis is partitioned into two stages that are executed in sequence. The partitioning into stages is defined such that failure of the first stages of all decoding hypotheses indicates that no data has been addressed to the terminal in the current sub-frame. (Successful decoding of the first decoding stage for one or more hypotheses, however, does not necessarily guarantee that data has been addressed to the receiver.)

In these embodiments, PDCCH decoder 36 tests the multiple hypotheses concurrently, while assigning high priority to execution of the first stages of the various hypotheses. Based only on the decoded first stages, decoder 36 is able to identify a time period in which no data is to be addressed to terminal 20 in the current sub-frame. For example, if the first stages of all hypotheses fail, decoder 36 instructs RF control unit 44 to shut down the receiver circuitry for at least part of the data zone.

Figure 4:
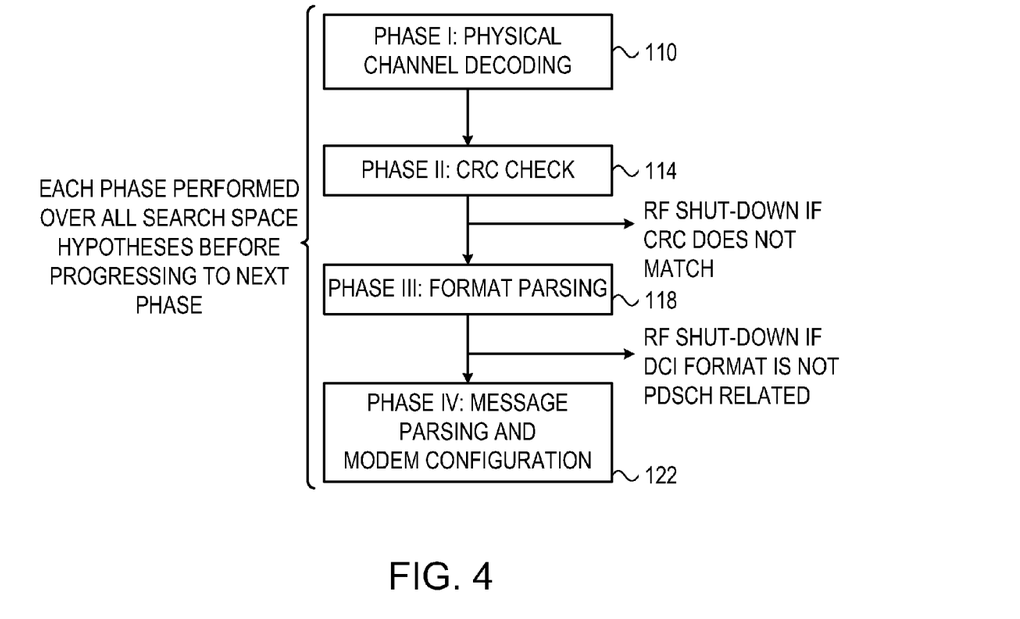
FIG. 4 is a flow chart that schematically illustrates a method for decoding and intermittent RF shut-down, in accordance with another embodiment of the present invention.

FIG. 4 is a flow chart that schematically illustrates a method for decoding and intermittent RF shut-down, in accordance with another embodiment of the present invention. Steps 110, 114, 118 and 122 illustrate the four phases (I-IV) of testing each hypothesis, as described above. In some embodiment, phases II and III may be performed in reverse order.

Two possible conditions for receiver shut down are shown in the figure. According to one possible condition, circuitry 32 shuts-down the receiver circuitry after completing phase II of all hypotheses, if CRC verification fails for all hypotheses. In this embodiment, the first stage comprises phases I and II, and the second stage comprises phases III and IV.

According to a second possible condition, circuitry 32 shuts-down the receiver circuitry after completing phase III of all hypotheses, if the DCI format is not PDSCH-related in any of the hypotheses (i.e., that the DCI format is not indicative of a data channel allocation). In this embodiment, the first stage comprises phases I-III, and the second stage comprises phase IV.

Since the execution of the first stages of the various hypotheses is assigned high priority over the second stages, decoder 36 typically completes the first stages of all hypotheses with small latency. Therefore, decoder 36 is able to invoke shut-down of receiver circuitry early in the sub-frame, and thus reduce power consumption.

In various embodiments, decoder 36 may prioritize the execution of the first stages over the second stages in various ways. For example, decoder 36 may execute phases I-II (or I-III) for all hypotheses before executing the next phases of any of the hypotheses. In some embodiments, the design of decoder 36 is optimized for fast execution of phases I-II (or I-III) of all hypotheses with small latency.

Prioritization schemes that can be applied by decoder 36 and meet these guidelines comprise, for example:

Prevent sharing of processing resources between the execution of phases I-II, execution of phase III and execution of phase IV.

Allow sharing of processing resources between the different phases, but order the processing on the shared resources such that phases I-II are completed for all hypotheses first, then phase III is completed for all relevant hypotheses (that were not ruled out in previous phases), and finally phase IV is completed for all relevant hypotheses.

Execute the various phases in a pipelined manner, but design the phase execution and buffering between phases such that execution of phases I-III (both individually for a given hypothesis and collectively for all hypotheses) is not delayed by execution of later phases of preceding hypotheses in the pipeline.

The schemes described above are chosen purely by way of example. In alternative embodiments, the hypothesis testing process may comprise any other suitable sequence of phases and may be partitioned into stage in any other suitable way. Prioritizing execution of the first stages of all hypotheses over the second stages can be defined and manages in any other suitable way.

Although the embodiments described herein mainly address LTE communication terminals, the methods and systems described herein can also be used in other types of communication equipment, such as, for example, LTE-A communication terminals and various types of repeaters.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
in a receiver, receiving over a wireless communication channel a signal that carries at least a sequence of reference signals and a control channel;
computing a first estimate of a response of the wireless communication channel using a first estimation process that estimates the response based on reference signals received over a first time interval of the sequence of the reference signals, and decoding the control channel based on the first estimate;
upon identifying, based on the decoded control channel, a time period during which no data channel is to be addressed to the receiver, shutting down circuitry of the receiver for at least part of the identified time period; and
computing a second estimate of the response using a second estimation process that estimates the response based on reference signals received over a second time interval of the same sequence of the reference signals, longer than the first time interval, and decoding a data channel that is addressed to the receiver based on the second estimate.

2. The method according to claim 1, wherein the first estimation process comprises a causal estimation process that estimates the response for a given time using only one or more reference signals that are no later than the given time, and wherein the second estimation process comprises a non-causal estimation process that estimates the response using at least one reference signal that is subsequent to the given time.

3. The method according to claim 1, wherein the first estimation process estimates the response for a given time using one or more reference signals in the first time interval following the given time, and wherein the second estimation process estimates the response for the given time using at least one reference signal in the second time interval following the given time.

4. The method according to claim 1, wherein the first estimation process has a first processing delay, and wherein the second estimation process a second processing delay, larger than the first processing delay.

5. The method according to claim 1, wherein identifying the time period comprises detecting that the control channel conveys an allocation for the data channel addressed to the receiver, and selecting the time period so as to fall outside the allocation.

6. The method according to claim 1, wherein the received signal conforms to a Long Term Evolution (LTE) specification, wherein the control channel comprises a Physical Downlink Control Channel (PDCCH), and wherein the data channel comprises a Physical Downlink Shared Channels (PDSCH).

7. A communication apparatus, comprising:
a receiver, which is configured to receive over a wireless communication channel a signal that carries at least a sequence of reference signals and a control channel; and
processing circuitry, which is configured to compute a first estimate of a response of the wireless communication channel using a first estimation process that estimates the response based on reference signals received over a first time interval of the sequence of the reference signals, to decode the control channel based on the first estimate, to shut-down, upon identifying based on the decoded control channel a time period during which no data channel is to be addressed to the receiver, circuitry of the receiver for at least part of the identified time period, to compute a second estimate of the response using a second estimation process that estimates the response based on reference signals received over a second time interval of the same sequence of the reference signals, longer than the first time interval, and to decode a data channel that is addressed to the receiver based on the second estimate.

8. A method for communication, comprising:
in a receiver, receiving a signal that carries a sequence of frames, each frame comprising at least a control channel followed by a data zone;
decoding the received signal out-of-order, such that decoding of the control channel of a second frame in the same single sequence of the frames begins before a data channel in the data zone of a first frame in the same single sequence, which precedes the second frame in the same single sequence, is fully decoded, even though the data channel in the first frame precedes the control channel in the second frame;
identifying, based on the decoded control channel of the second frame, a time period during which no data is to be addressed to the receiver in the data zone of the second frame; and
shutting down Radio-Frequency (RF) circuitry of the receiver for at least part of the identified time period.

9. The method according to claim 8, wherein decoding the received signal comprises decoding the control channel and the data channel using respective, independent first and second decoders.

10. The method according to claim 8, wherein decoding the received signal comprises sharing a processing resource between decoding of the control channel and decoding of the data channel, and prioritizing assignment of the shared processing resource such that decoding of the control channel of the second frame begins before the data channel of the first frame is fully decoded.

11. The method according to claim 8, wherein identifying the time period comprises detecting that the control channel of the second frame does not contain a data channel allocation addressed to the receiver.

12. The method according to claim 8, wherein identifying the time period comprises detecting that the control channel of the second frame conveys a data channel allocation addressed to the receiver, and selecting the time period so as to fall outside the data channel allocation.

13. The method according to claim 8, wherein the received signal conforms to a Long Term Evolution (LTE) specification, wherein the control channel comprises a Physical Downlink Control Channel (PDCCH), and wherein the data channel comprises a Physical Downlink Shared Channel (PDSCH).

14. A communication apparatus, comprising:
a receiver, which is configured to receive a signal that carries a sequence of frames, each frame comprising at least a control channel followed by a data zone; and
processing circuitry, which is configured to decode the received signal out-of-order, such that decoding of the control channel of a second frame in the same single sequence of the frames begins before a data channel in the data zone of a first frame in the same single sequence, which precedes the second frame in the same single sequence, is fully decoded, even though the data channel in the first frame precedes the control channel in the second frame, to identify, based on the decoded control channel of the second frame, a time period during which no data is to be addressed to the apparatus in the data zone of the second frame, and to shut down Radio-Frequency (RF) circuitry of the receiver for at least part of the identified time period.

* * * * *